United States Patent
Maniktala (10) Patent No.: US 10,312,745 B2
(45) Date of Patent: Jun. 4, 2019

(54) WIRELESS POWER TRANSFER SYSTEM WITH AUTOMATIC FOREIGN OBJECT REJECTION

(71) Applicant: ChargEdge, Inc., Fremont, CA (US)

(72) Inventor: Sanjaya Maniktala, Fremont, CA (US)

(73) Assignee: ChargEdge, Inc., Fremont, CA (US)

( * ) Notice: Subject to any disclaimer, the term of this patent is extended or adjusted under 35 U.S.C. 154(b) by 0 days.

(21) Appl. No.: 15/635,495

(22) Filed: Jun. 28, 2017

(65) Prior Publication Data

US 2017/0302112 A1    Oct. 19, 2017

Related U.S. Application Data

(63) Continuation-in-part of application No. 15/082,533, filed on Mar. 28, 2016.
(Continued)

(51) Int. Cl.
*H01F 27/42* (2006.01)
*H02J 50/60* (2016.01)
(Continued)

(52) U.S. Cl.
CPC ............ *H02J 50/60* (2016.02); *H02J 7/0044* (2013.01); *H02J 7/025* (2013.01); *H02J 50/10* (2016.02); *H02J 50/12* (2016.02); *H02J 50/40* (2016.02)

(58) Field of Classification Search
CPC ............. H02J 7/025; H02J 50/10; H02J 50/12
See application file for complete search history.

(56) References Cited

U.S. PATENT DOCUMENTS

| 6,212,430 B1 | 4/2001 | Kung | |
|---|---|---|---|
| 8,975,865 B2 * | 3/2015 | Hickox | B60L 11/1829 320/109 |

(Continued)

FOREIGN PATENT DOCUMENTS

WO    WO2013122483 A1    8/2013

OTHER PUBLICATIONS

Wireless Power Consortium, "Qi System Description Wireless Power Transfer," vol. I: Low Power, Part 1: Interface Definition, Version 1.1.2, Jun. 2013.
(Continued)

*Primary Examiner* — Sibin Chen
(74) *Attorney, Agent, or Firm* — White & Case LLP (57) ABSTRACT

In one embodiment, a wireless power transmitter comprises a transmitter coil structure comprising a magnetic layer having a geometric center line, the magnetic layer being curved symmetrically about a geometric center line, a first coil coupled to a second coil, the first coil and second coil wound in such a way that when a current flows in the first coil in a first spatial direction the current flows in the second coil in a second spatial direction, the first coil and the second coil disposed on the magnetic layer substantially symmetrically about the geometric center line of the magnetic layer, a power circuit configured to provide a time-varying current to the transmitter coil structure; and a housing including an outer surface having a convex shape, the transmitter coil structure being disposed underneath the outer surface of the housing. The convex outer surface of the wireless power transmitter exploits gravity to cause foreign objects to slide or roll away from the magnetic field generated by the transmitter.

20 Claims, 5 Drawing Sheets

Related U.S. Application Data (60) Provisional application No. 62/357,944, filed on Jul. 2, 2016.

(51) Int. Cl.
  *H02J 50/10*   (2016.01)
  *H02J 7/02*    (2016.01)
  *H02J 7/00*    (2006.01)
  *H02J 50/40*   (2016.01)
  *H02J 50/12*   (2016.01)

(56) References Cited

U.S. PATENT DOCUMENTS

| | | | |
|---|---|---|---|
| 9,276,437 | B2 | 3/2016 | Partovi et al. |
| 2006/0061324 | A1 | 3/2006 | Oglesbee |
| 2009/0096413 | A1 | 4/2009 | Partovi et al. |
| 2010/0181841 | A1 | 7/2010 | Azancot et al. |
| 2010/0259217 | A1 | 10/2010 | Baarman et al. |
| 2011/0115429 | A1 | 5/2011 | Toivola et al. |
| 2011/0217927 | A1 | 9/2011 | Ben-Shalom et al. |
| 2012/0154086 | A1 | 6/2012 | Willemsen et al. |
| 2013/0043734 | A1 | 2/2013 | Stone et al. |
| 2013/0093252 | A1 | 4/2013 | Norconk et al. |
| 2013/0175877 | A1 | 7/2013 | Abe et al. |
| 2013/0214591 | A1 | 8/2013 | Miller et al. |
| 2013/0249479 | A1 | 9/2013 | Partovi |
| 2013/0307468 | A1 | 11/2013 | Lee et al. |
| 2014/0070622 | A1 | 3/2014 | Keeling et al. |
| 2014/0167688 | A1 | 6/2014 | Doyle et al. |
| 2014/0191584 | A1* | 7/2014 | Kato ............... H02J 7/0044 307/104 |
| 2014/0232330 | A1 | 8/2014 | Robertson et al. |
| 2014/0266031 | A1 | 9/2014 | Sasaki |
| 2015/0091388 | A1 | 4/2015 | Golko et al. |
| 2015/0115727 | A1* | 4/2015 | Carobolante ........ H02J 5/005 307/104 |
| 2015/0295416 | A1 | 10/2015 | Li |
| 2015/0372493 | A1 | 12/2015 | Sankar |

OTHER PUBLICATIONS

Maniktala, S., "Fixing EMI across the Board," EE Times, Nov. 5, 2003, http://www.eetimes.com/document.asp?doc_id=1230444.

Maniktala, S., "More on Designing Reliable Electronic Ballasts," EE Times, Apr. 20, 2005, http://www.eetimes.com/document.asp?doc_id=1272231.

Maniktala, S. "The Confluence of Resonant Switching Topologies and Wireless Charging," presented at ISSCC 2015, San Francisco, CA, Feb. 26, 2015.

Maniktala, S., "WPT Breaks All Connections, Part 1," EDN Network, Mar. 9, 2015, http://www.edn.com/design/power-management/4438850/WPT-breaks-all-connections—Part-1.

Maniktala, S., "WPT Breaks All Connections, Part 2," EDN Network, Mar. 14, 2015, http://www.edn.com/design/power-management/4438924/WPT-breaks-all-connections—Part-2.

Maniktala, S., "WPT Breaks All Connections, Part 3," EDN Network, Apr. 6, 2015, http://www.edn.com/design/power-management/4439125/WPT-breaks-all-connections—Part-3.

Power Matters Alliance, "PMA Inductive Wireless Power and Charging Transmitter Specification—System Release 1," PMA-TS-0003-0 v2.00, Apr. 24, 2014.

Power Matters Alliance, "PMA Inductive Wireless Power and Charging Receiver Specification—System Release 1," PMA-TS-0001-0 v1.00, Nov. 16, 2013.

"Notification of Transmittal of the International Search Report and the Written Opinion of the International Searching Authority," Int'l Appl. No. PCT/US2016/066105, dated Feb. 7, 2017.

"Notification of Transmittal of the International Search Report and the Written Opinion of the International Searching Authority," Int'l Appl. No. PCT/US2017/020465, dated May 11, 2017.

"Notification of Transmittal of the International Search Report and the Written Opinion of the International Searching Authority," Int'l Appl. No. PCT/US16/024483, dated Jun. 20, 2016.

* cited by examiner

WIRELESS POWER TRANSFER SYSTEM WITH AUTOMATIC FOREIGN OBJECT REJECTION

CROSS-REFERENCE TO RELATED APPLICATIONS

This application claims the benefit of U.S. Provisional Patent Application No. 62/357,944, entitled "Wireless Power Transfer System with Automatic Foreign Object Rejection," filed on Jul. 2, 2016. This application is also a continuation-in-part of U.S. patent application Ser. No. 15/082,533, entitled "Wireless Power Transfer Using Multiple Coil Arrays," filed on Mar. 28, 2016. This application is also related to U.S. patent application Ser. No. 15/375,499, filed on Dec. 12, 2016, entitled "System for Inductive Wireless Power Transfer for Portable Devices." The subject matters of these related applications are hereby incorporated by reference in their entirety.

FIELD OF THE INVENTION

The invention relates generally to wireless power transfer and more particularly to a wireless power transfer system with automatic foreign object rejection.

BACKGROUND

Electronic devices typically require a connected (wired) power source to operate, for example, battery power or a wired connection to a direct current ("DC") or alternating current ("AC") power source. Similarly, rechargeable battery-powered electronic devices are typically charged using a wired power-supply that connects the electronic device to a DC or AC power source. The limitation of these devices is the need to directly connect the device to a power source using wires.

Wireless power transfer (WPT) involves the use of time-varying magnetic fields to wirelessly transfer power from a source to a device. Faraday's law of magnetic induction provides that if a time-varying current is applied to one coil (e.g., a transmitter coil) a voltage will be induced in a nearby second coil (e.g., a receiver coil). The voltage induced in the receiver coil can then be rectified and filtered to generate a stable DC voltage for powering an electronic device or charging a battery. The receiver coil and associated circuitry for generating a DC voltage can be connected to or included within the electronic device itself such as a smartphone or tablet.

The Wireless Power Consortium (WPC) was established in 2008 to develop the Qi inductive power standard for charging and powering electronic devices. Powermat is another well-known standard for WPT developed by the Power Matters Alliance (PMA). The Qi and Powermat near-field standards operate in the frequency band of 100-400 kHz. The problem with near-field WPT technology is that typically only 5 Watts of power can be transferred over the short distance of 2 to 5 millimeters between a power source and an electronic device, though there are ongoing efforts to increase the power. For example, some concurrently developing standards achieve this by operating at much higher frequencies, such as 6.78 MHz or 13.56 MHz. Though they are called magnetic resonance methods instead of magnetic induction, they are based on the same underlying physics of magnetic induction. There also have been some market consolidation efforts to unite into larger organizations, such as the AirFuel Alliance consisting of PMA and the Rezence standard from the Alliance For Wireless Power (A4WP), but the technical aspects have remained largely unchanged.

Typical wireless power transfer transmitters have a flat or concave surface on which devices to be charged are placed. Objects other than devices that can be wirelessly charged are sometimes placed on the charging surface of a wireless power transmitter, whether intentionally or inadvertently. Certain metal objects such as coins, paper clips, and some jewelry can develop eddy currents in response to the varying magnetic field produced by the wireless power transmitter. Such "foreign objects" cause losses in the power being transferred to a wirelessly-chargeable device. Also, if left on the surface of the transmitter for a period of time, the eddy currents can cause the foreign metal object to overheat, potentially causing burns or igniting a fire.

The foreign object detection technique set forth in the Qi standard compares the amount of power transmitted by the transmitter and the amount of power that the wireless power receiver reports back to the transmitter. The difference between the two values is a loss number. Eddy currents that develop in a foreign object, such as a coin, on the transmitter surface will cause the loss number to increase. If the loss number exceeds a predetermined threshold, an indicator such as a light emitting diode may be triggered while the transmitter continues to transmit power. If the loss number exceeds the predetermined threshold for a predetermined amount of time, for example ten seconds, the transmitter will stop transmitting power. This technique shuts off the power from the transmitter before significant heat can build up in the foreign object. But a user may not realize that the transmitter has stopped transmitting power and assume that device charging is still in progress. So while the Qi foreign object detection technique improves the safety of the wireless power transmitter, it has the drawback of shutting off charging without the user realizing that charging has stopped.

Another drawback of existing methods of foreign object detection relates to inaccuracy in determining the actual amount of power transmitted or received. For example, a Qi-compliant transmitter indirectly estimates the AC power transmitted by the coil by sensing the DC voltage and current input to the transmitter, which can cause over 300 mW of error at 5 W. In other words, based on the input DC values, when a Qi transmitter determines that it is transmitting 5 W, the actual power may be a value between 4.7 W to 5.3 W. Similarly, a Qi-compliant receiver also indirectly estimates the AC power reaching its coil by sensing the output DC voltage and current, which can cause an error of 300 mW at 5 W. These errors at the transmitter and receiver can compound such that a foreign object escapes detection. For example, a Qi transmitter may be transmitting 5.3 W of power and the Qi receiver may be receiving 4.7 W of power, so the actual power loss is 600 mW, which can be caused by a coin or other foreign object on the transmitter absorbing the 600 mW. But because of errors both the transmitter and receiver sense that the power being transferred is 5 W, so the loss number is determined to be zero and the transmitter keeps operating. Absorbing 600 mW of power can raise the temperature of a coin to a potentially unsafe level. This problem becomes even more dangerous for systems operating at higher power levels such as 10 W. Assuming the same percentage of error, the transmitter and receiver would each have a sensing error of 0.6 W, which could lead to a total power loss of 1.2 W going undetected. A coin on the transmitter absorbing 1.2 W of power going undetected can rise to a temperature that is a definite fire hazard. This inaccuracy in sensing transferred power is a major drawback that prevents Qi-compliant systems from safely delivering more than 5 W. Thus there is a need for an improved technique for dealing with foreign objects.

SUMMARY

In one embodiment, a wireless power transmitter comprises a transmitter coil structure comprising a magnetic layer having a geometric center line, the magnetic layer being curved symmetrically about the geometric center line, a first coil coupled to a second coil, the first coil and second coil wound in such a way that when a current flows in the first coil in a first spatial direction the current flows in the second coil in a second spatial direction, the first coil and the second coil disposed on the magnetic layer substantially symmetrically about the geometric center line of the magnetic layer, a power circuit configured to provide a time-varying current to the transmitter coil structure, and a housing including an outer surface having a convex shape, the transmitter coil structure being disposed underneath the outer surface of the housing. The convex outer surface of the wireless power transmitter exploits gravity to cause foreign objects to slide or roll away from the magnetic field generated by the transmitter. In one embodiment, the wireless power transmitter includes one or more slots in the outer surface of the housing configured to hold a mobile device in a substantially upright position for charging. In one embodiment, the wireless power transmitter includes one or more device holders coupled to the outer surface of the housing configured to hold a mobile device in a substantially uprights position for charging.

In one embodiment, a wireless power transmitter comprises a transmitter coil structure comprising a magnetic layer having a geometric center line, the magnetic layer forming an angle at the geometric center line, a first coil coupled to a second coil, the first coil and second coil wound in such a way that when a current flows in the first coil in a first spatial direction the current flows in the second coil in a second spatial direction, the first coil and the second coil disposed on the magnetic layer substantially symmetrically about the geometric center line of the magnetic layer, and a housing including an outer surface having a convex shape, the transmitter coil structure being disposed underneath the outer surface of the housing. In one embodiment the angle formed by the magnetic layer is angle from about 30° to about 150°. The convex outer surface of the wireless power transmitter exploits gravity to cause foreign objects to slide or roll away from the magnetic field generated by the transmitter.

DETAILED DESCRIPTION

Figure 1:
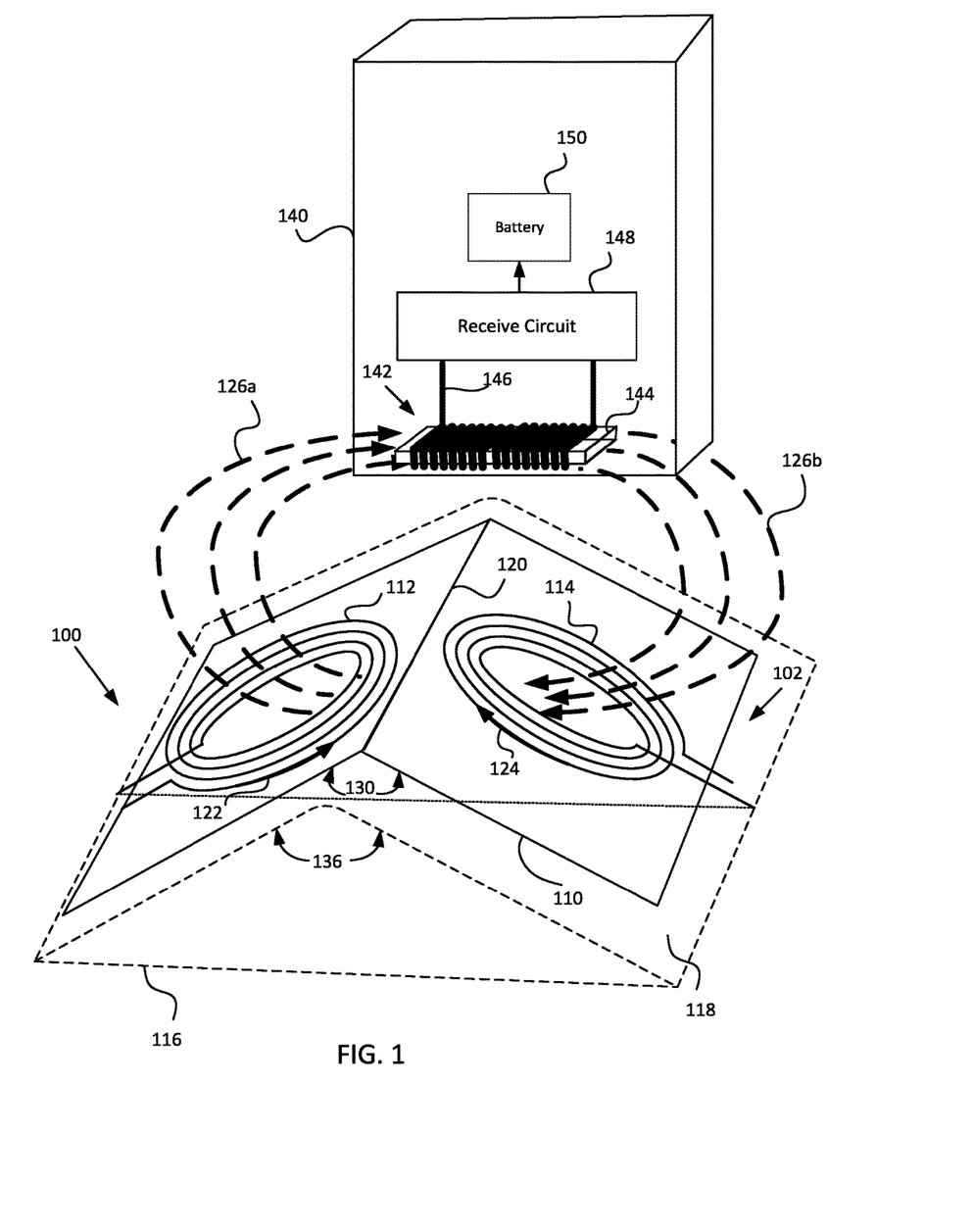
FIG. 1 is a diagram of one embodiment of a wireless power transmitter with foreign object rejection, according to the invention.

FIG. 1 is a diagram of one embodiment of a wireless power transmitter 100 with foreign object rejection, according to the invention. Wireless power transmitter 100 includes, but is not limited to, an opposite polarity coil structure 102 that includes a first coil 112 and second coil 114 that are magnetically coupled together by a magnetic layer 110. First coil 112 and second coil 114 are preferably identical coils with the same number of turns and the same area. First coil 112 and second coil 114 can be formed of wire or traces on a printed circuit board using conductive material such as copper, gold, or any other conductive material known in the art. Magnetic layer 110 is a single piece of magnetic material, such as ferrite, that is bent or curved along a geometric center line (midline) 120 to form an angle 130. Angle 130 is in the range of about 30° to about 150°, and preferably in the range of about 90° to about 150°. Magnetic layer 110 fully underlies both first coil 112 and second coil 114, and first coil 112 and second coil 114 are located substantially symmetrically about geometric center line 120 of magnetic layer 110. In other embodiments, magnetic layer 110 may be formed of two sheets of magnetic material joined together to form angle 130. Transmitter 100 also includes a housing 116 with an outer surface 118 covering coils 112 and 114 and magnetic layer 110. Outer surface 118 is bent or curved to form an angle 136 in the range of about 30° to about 150°, and preferably in the range of about 90° to about 150°. Outer surface 118 is made from a smooth, non-metallic, and non-magnetic material such as glass, wood, rubber, or plastic. The convex shape of outer surface 118 exploits the effects of gravity to cause foreign objects such as coins or jewelry to roll or slide away from the magnetic field generated by transmitter 100. The strength of the magnetic field generated by transmitter 100 at the lower peripheral regions of outer surface 118 is sufficiently low such that if a foreign object does not roll or slide completely off of outer surface 118 any heating of the foreign object will not be significant.

Transmitter 100 also includes a power circuit (not shown) that supplies an alternating current to first coil 112 and second coil 114. The resonant frequency of transmitter 100 is determined by the capacitance of a capacitor (not shown) in the power circuit and the total inductance of first coil 112 and second coil 114. First coil 112 and second coil 114 are coupled together in series in such a way that when a current 122 flows in first coil 112 in a counter-clockwise direction a current 124 flows in second coil 114 in a clockwise direction. The flow of current 122 through first coil 112 generates a magnetic field represented by flux lines 126a and the flow of current 124 through second coil 114 generates a magnetic field represented by flux lines 126b. According to the "right-hand-rule," the counter-clockwise flow of current 122 in first coil 112 causes flux lines 126a to flow in an upward direction and the clockwise flow of current 124 in second coil 114 causes flux lines 126b to flow in a downward direction.

Current 122 is equivalent in magnitude to current 124 but flows in an opposite spatial direction. If first coil 112 and second coil 144 are identical in size and shape, the flow of current 122 through first coil 112 generates a magnetic field equivalent in magnitude to the magnetic field generated by the flow of current 124 through second coil 114. Because current 122 and current 124 are flowing in opposite spatial directions at any given point in time, the magnetic field generated by current 122 is in a different direction than the magnetic field generated by current 124 (i.e., the magnetic fields have different polarity). Further, because flux lines 126a and flux lines 126b are flowing in opposite directions, the magnetic reluctance between flux lines 126a and flux lines 126b is low, causing flux lines 126a and flux lines 126b to attract to each other. Magnetic layer 110 provides a return path for flux lines 126a and 126b.

A mobile device 140 includes but is not limited to a wireless power receiver coil structure 142, a receive circuit 148, and a battery 150. Receiver coil structure 142 includes a ferrite core 144 and a coil 146 would around ferrite core 144. In the FIG. 1 embodiment, ferrite core 144 is in the shape of a parallelepiped; in other embodiments ferrite core 144 may be a circular or elliptical cylinder or other shape, or may be made of a flexible ferrite sheet. Coil 146 is preferably formed of wire made from a conductive material such as copper, gold, or any other conductive material known in the art. As shown in FIG. 1, mobile device 140 is oriented in relation to transmitter 100 such that flux lines 126a and 126b of the magnetic fields produced by transmitter 100 are substantially parallel to a longitudinal axis of receiver coil structure 142. Faraday's law provides that the time-varying current that flows in a receiver coil will oppose the magnetic field generated by a transmitter coil. Thus flux lines 126a and 126b passing through ferrite core 144 cause a time-varying current to flow in coil 146. Receiver coil structure 142 is coupled to receive circuit 148 such that an induced current is input to receive circuit 148. Receive circuit 148 includes, but is not limited to, a rectifier to generate a DC voltage, a filter to reduce noise, and a voltage regulator to define a voltage magnitude and maintain the voltage under load. The DC voltage generated by receive circuit 148 as a result of the power received from transmitter 100 charges battery 150.

Figure 2:
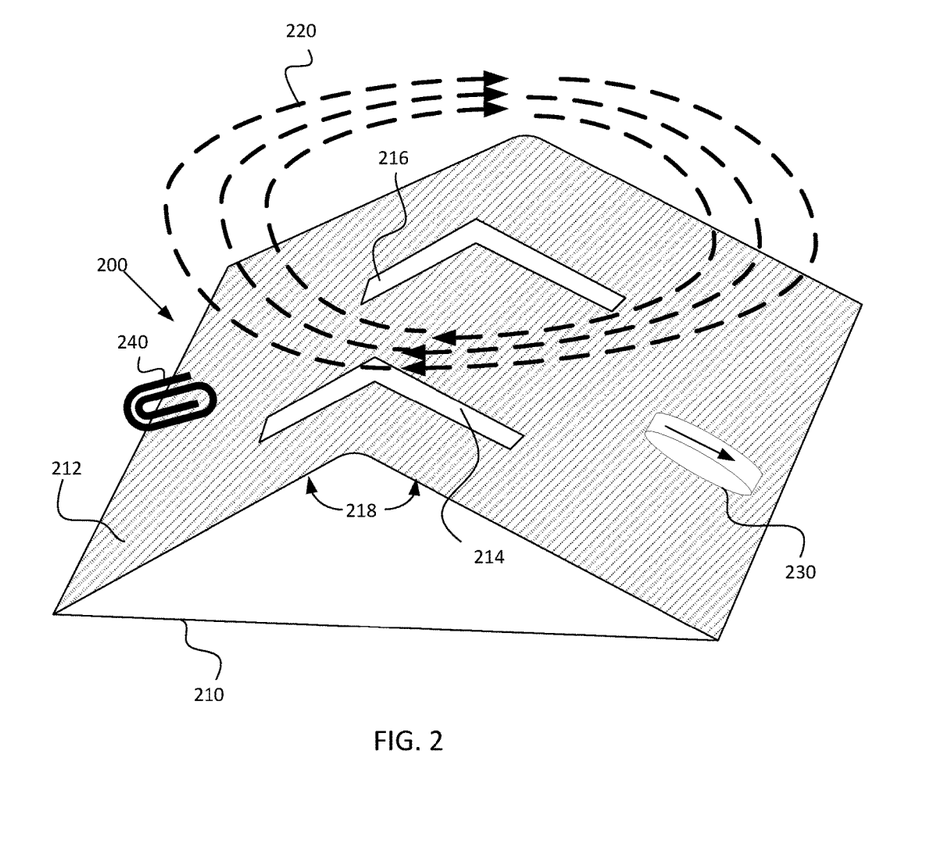
FIG. 2 is a diagram of one embodiment of a wireless power transmitter with foreign object rejection and including slots to hold a mobile device, according to the invention.

FIG. 2 is a diagram of one embodiment of a wireless power transmitter 200 with foreign object rejection and including slots to hold a mobile device, according to the invention. Transmitter 200 includes a housing 210 with an outer surface 212, an opposite polarity coil structure (not shown) such as opposite polarity coil structure 102 of FIG. 1, and a power circuit (not shown). Transmitter 200 produces a magnetic field that is represented by closed flux lines 220. Outer surface 212 is bent or curved to form an angle 218 in the range of about 30° to about 150°, and preferably in the range of about 90° to about 150°. Outer surface 212 is made from a smooth, non-metallic, and non-magnetic material such as glass, wood, rubber, or plastic. The convex shape of outer surface 212 exploits the effects of gravity to cause foreign objects such as a coin 230 or a paper clip 240 to roll or slide away from the magnetic field, represented by flux lines 220, generated by transmitter 200. The strength of the magnetic field generated by transmitter 200 at the lower peripheral regions of outer surface 212 is sufficiently low such that if a foreign object does not roll or slide completely off of outer surface 212 any heating of the foreign object will not be significant. Transmitter 200 also includes a slot 214 and a slot 216 in outer surface 212. Each of slots 214 and 216 has a size and shape to securely support a mobile device such as a smartphone or tablet in an upright (vertical) orientation for charging by transmitter 200, yet not trap coins or other foreign objects. Although two slots 214 and 216 are shown in FIG. 2, any number of slots are within the scope of the invention.

In one embodiment, transmitter 200 is implemented in a vehicle's center or front console to enable wireless charging of one or more mobile devices. Slot 214 or slot 216 enable a mobile device having a receiver coil structure such as receiver coil structure 142 of FIG. 1 to be charged while securely holding the mobile device in an upright (vertical) orientation. In one embodiment, transmitter 200 may be a stand-alone unit that can be placed on a tabletop, desktop, or other flat surface.

Figure 3:
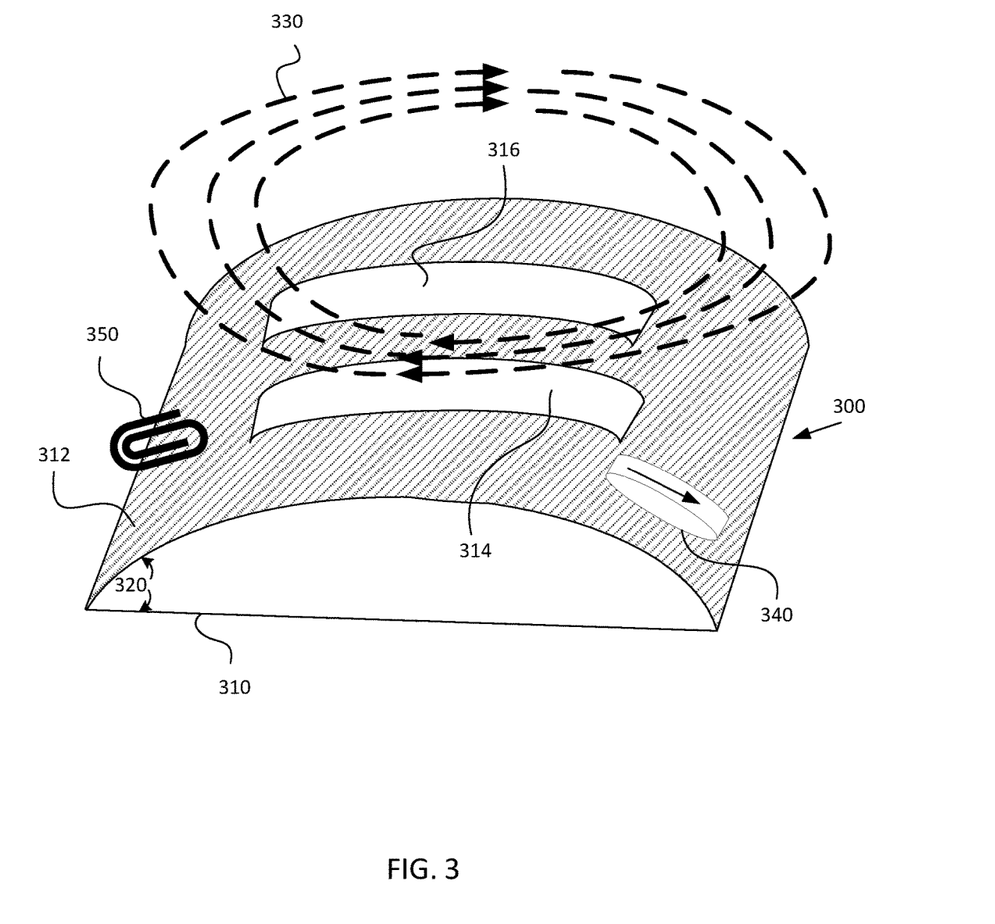
FIG. 3 is a diagram of one embodiment of a wireless power transmitter with foreign object rejection and including slots to hold a mobile device, according to the invention.

FIG. 3 is a diagram of one embodiment of a wireless power transmitter 300 with foreign object rejection and including slots to hold a mobile device, according to the invention. Transmitter 300 includes a housing 310 with an outer surface 312, an opposite polarity coil structure (not shown) such as opposite polarity coil structure 102 of FIG. 1, and a power circuit (not shown). Transmitter 300 produces magnetic fields that are represented by closed flux lines 330. Outer surface 312 is curved to form an angle 320 preferably in the range of about 30° to about 90°. When angle 320 is about 90°, a cross-section of housing 310 is approximately semi-circular. In other embodiment, the curvature of outer surface 312 can be parabolic or hyperbolic. Outer surface 312 is made from a smooth, non-metallic, and non-magnetic material such as glass, wood, rubber, or plastic. The convex shape of outer surface 312 exploits the effects of gravity to cause foreign objects such as a coin 340 or a paper clip 350 to roll or slide away from the magnetic field, represented by flux lines 330, generated by transmitter 300. The strength of the magnetic field generated by transmitter 300 at the lower peripheral regions of outer surface 312 is sufficiently low such that if a foreign object does not roll or slide completely off of outer surface 312 any heating of the foreign object will not be significant. Transmitter 300 also includes a slot 314 and a slot 316 in outer surface 312. Each of slots 314 and 316 has a size and shape to securely support a mobile device such as a smartphone or tablet in an upright (vertical) orientation for charging yet not trap coins or other foreign objects. Although two slots 314 and 316 are shown in FIG. 3, any number of slots are within the scope of the invention.

In one embodiment, transmitter 300 is implemented in a vehicle's center or front console to enable wireless charging of one or more mobile devices. Slot 314 or slot 316 enable a mobile device having a receiver coil structure such as receiver coil structure 142 of FIG. 1 to be charged while securely holding the mobile device in an upright (vertical) orientation. In one embodiment, transmitter 300 may be a stand-alone unit that can be placed on a tabletop or other flat surface.

Figure 4:
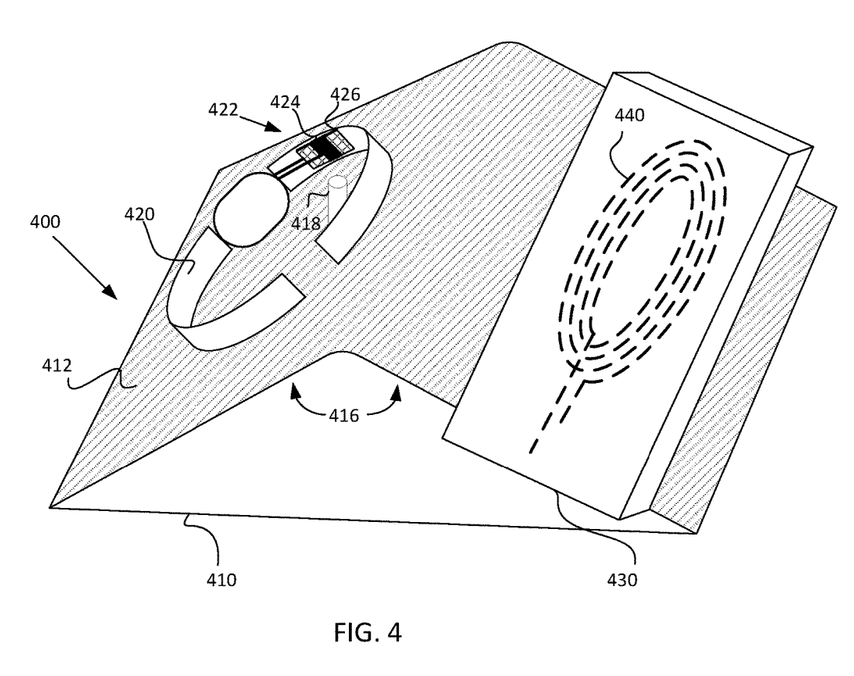
FIG. 4 is a diagram of one embodiment of a wireless power transmitter with foreign object rejection charging a wearable device and a mobile device, according to the invention.

FIG. 4 is a diagram of one embodiment of a wireless power transmitter 400 with foreign object rejection charging a wearable device and a mobile device, according to the invention. Transmitter 400 includes a housing 410 with an outer surface 412, an opposite polarity coil structure (not shown) such as opposite polarity coil structure 102 of FIG. 1, and a power circuit (not shown). Transmitter 400 produces a magnetic field that can be represented by closed flux lines (not shown) to provide wireless power to a wearable device 420 and a mobile device 430. Outer surface 412 is bent or curved to form an angle 416 in the range of about 30° to about 150°, and preferably in the range of about 90° to about 150°. Outer surface 412 is made from a smooth, non-metallic, and non-magnetic material such as glass, wood, rubber, or plastic. The convex shape of outer surface 412 exploits the effects of gravity to cause foreign objects such as coins, paper clips, or jewelry to roll or slide away from the magnetic field generated by transmitter 400. The strength of the magnetic field generated by transmitter 400 at the lower peripheral regions of outer surface 412 is sufficiently low such that if a foreign object does not roll or slide completely off of outer surface 412 any heating of the foreign object will not be significant.

Wearable device 420 includes a receiver coil structure 422 that includes a ferrite core 426 and a coil 424 wound around ferrite core 426. In the FIG. 4 embodiment, ferrite core 426 is in the shape of a parallelepiped; in other embodiments ferrite core 426 may be a circular or elliptical cylinder or other shape, or may be made of a flexible ferrite sheet. Coil 424 is preferably formed of wire made from a conductive material such as copper, gold, or any other conductive material known in the art. As shown in FIG. 4, wearable device 420 is oriented in relation to transmitter 400 such that flux lines of the magnetic fields produced by transmitter 400 are substantially parallel to a longitudinal axis of receiver coil structure 422. Faraday's law provides that the time-varying current that flows in a receiver coil will oppose the magnetic field generated by a transmitter coil. Thus flux lines produced by transmitter 400 passing through ferrite core 426 cause a time-varying current to flow in coil 424. Receiver coil structure 422 is coupled to a receive circuit (not shown) such that an induced current is input to the receive circuit, which produces a voltage that charges a battery (not shown) of wearable device 420. Transmitter 400 also includes a post 418, coupled to outer surface 412, having a shape and size to restrain wearable device 420 on outer surface 412 while not trapping foreign objects such as coins.

A mobile device 430, such as a smartphone, includes a flat spiral receiver coil 440. In one embodiment, receiver coil 440 complies with the Qi standard. When mobile device 430 is placed on outer surface 412 as shown in FIG. 4, a magnetic field generated by transmitter 400 will induce a current in receiver coil 440 to charge a battery (not shown) of mobile device 430. Angle 416 has a value such that mobile device 430 will not slide off of outer surface 412 of transmitter 400 yet will provide sufficient slope to outer surface 412 such that small foreign objects such as coins or keys will roll or slide away from the magnetic fields generated by transmitter 400. In another embodiment, transmitter 400 includes one or more posts (not shown) coupled to outer surface 412 that prevent mobile device 430 from sliding away from the magnetic field generated by transmitter 400 while not trapping foreign objects such as coins.

Figure 5:
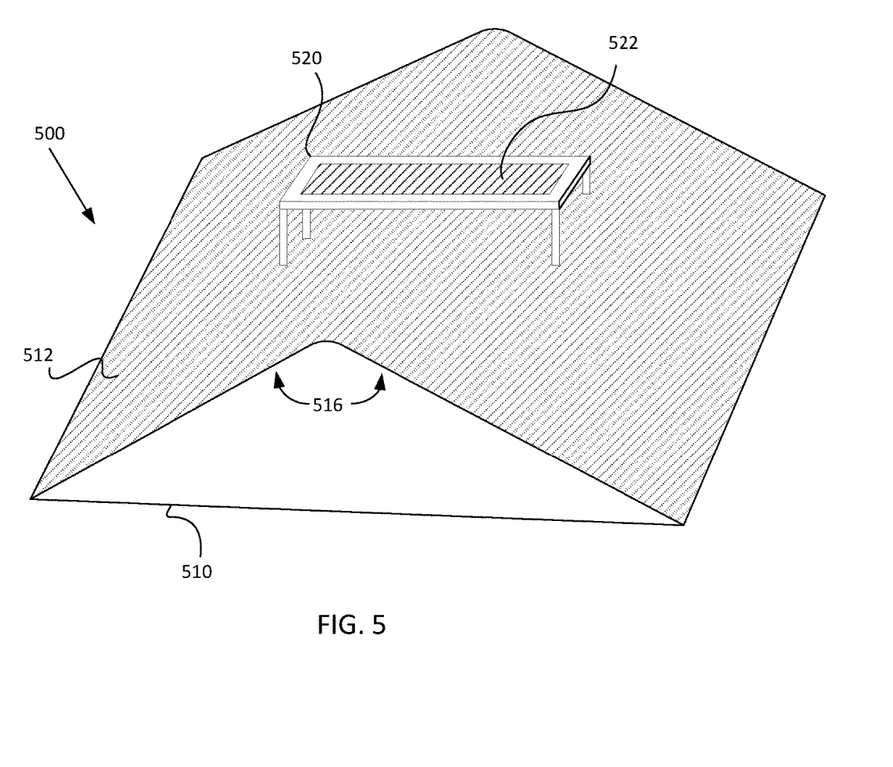
FIG. 5 is a diagram of one embodiment of a wireless power transmitter with foreign object rejection and including a device holder, according to the invention.

FIG. 5 is a diagram of one embodiment of a wireless power transmitter 500 with foreign object rejection and including a device holder, according to the invention. Transmitter 500 includes a housing 510 with an outer surface 512, an opposite polarity coil structure (not shown) such as opposite polarity coil structure 102 of FIG. 1, and a power circuit (not shown). Transmitter 500 produces a magnetic field that can be represented by closed flux lines (not shown). Outer surface 512 is bent or curved to form an angle 516 in the range of about 30° to about 150°, and preferably in the range of about 90° to about 150°. Outer surface 512 is made from a smooth, non-metallic, and non-magnetic material such as glass, wood, rubber, or plastic. The convex shape of outer surface 512 exploits the effects of gravity to cause foreign objects such as coins, paper clips, or jewelry to roll or slide away from the magnetic field generated by transmitter 500. The strength of the magnetic field generated by transmitter 500 at the lower peripheral regions of outer surface 512 is sufficiently low such that if a foreign object does not roll or slide completely off of outer surface 512 any heating of the foreign object will not be significant.

Transmitter 500 also includes a device holder 520 configured to securely hold a mobile device such as a smartphone or tablet for charging by transmitter 500. Device holder 520 includes an opening 522 through which a mobile device can be inserted to rest against outer surface 512. Device holder 520 is preferably made from a non-metallic and non-magnetic material such as glass, wood, rubber, or plastic. Although only one device holder 520 is shown in FIG. 5, any number of device holders is within the scope of the invention. In one embodiment, transmitter 500 includes one or more device holders in the form of clasps configured to support a mobile device in an upright (vertical) orientation. In one embodiment, transmitter 500 includes one or more device holders in the form of a clasp or bracket configured to support a mobile device in a horizontal orientation on outer surface 512.

In one embodiment, transmitter 500 is implemented in a vehicle's center or front console to enable wireless charging of one or more mobile devices. Device holder 520 enables a mobile device having a receiver coil structure such as receiver coil structure 142 of FIG. 1 to be charged while securely holding the mobile device in an upright (vertical) orientation. In one embodiment, transmitter 500 may be a stand-alone unit that can be placed on a tabletop or other flat surface.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A wireless power transmitter comprising:
   a transmitter coil structure comprising
      a magnetic layer having a geometric center line, the magnetic layer being curved symmetrically about the geometric center line;
      a first coil coupled to a second coil, the first coil and the second coil wound in such a way that when a current flows in the first coil in a first spatial direction the current flows in the second coil in a second spatial direction,
      the first coil and the second coil disposed on the magnetic layer substantially symmetrically about the geometric center line of the magnetic layer; and
   a housing including an outer surface having a convex shape,
   the transmitter coil structure being disposed underneath the outer surface of the housing.

2. The wireless power transmitter of claim 1, wherein the outer surface of the housing is curved substantially symmetrically about the geometric center line of the magnetic layer.

3. The wireless power transmitter of claim 1, wherein the housing has a cross-sectional area of a semicircular shape.

4. The wireless power transmitter of claim 1, wherein the outer surface of the housing has a shape substantially the same as the shape of the magnetic layer.

5. The wireless power transmitter of claim 1, further comprising at least one slot in the outer surface of the housing configured to hold a mobile device in a substantially upright position.

6. The wireless power transmitter of claim 1, further comprising at least one device holder coupled to the outer surface of the housing configured to hold a mobile device in a substantially upright position.

7. The wireless power transmitter of claim 1, wherein the magnetic layer is curved to form an angle from about 30° to about 150°.

8. A wireless power transmitter comprising:
a transmitter coil structure comprising
a magnetic layer having a geometric center line, the magnetic layer being curved symmetrically about the geometric center line;
a first coil coupled to a second coil, the first coil and the second coil wound in such a way that when a current flows in the first coil in a first spatial direction the current flows in the second coil in a second spatial direction,
the first coil and the second coil disposed on the magnetic layer substantially symmetrically about the geometric center line of the magnetic layer;
a power circuit configured to provide a time-varying current to the transmitter coil structure; and
a housing including an outer surface having a convex shape,
the transmitter coil structure being disposed underneath the outer surface of the housing.

9. The wireless power transmitter of claim 8, wherein the outer surface of the housing is curved substantially symmetrically about the geometric center line of the magnetic layer.

10. The wireless power transmitter of claim 8, wherein the housing has a cross-sectional area of a semicircular shape.

11. The wireless power transmitter of claim 8, wherein the outer surface of the housing has a shape substantially the same as the shape of the magnetic layer.

12. The wireless power transmitter of claim 8, further comprising at least one slot in the outer surface of the housing configured to hold a mobile device in a substantially upright position.

13. The wireless power transmitter of claim 8, further comprising at least one device holder coupled to the outer surface of the housing configured to hold a mobile device in a substantially upright position.

14. The wireless power transmitter of claim 8, wherein the magnetic layer is curved to form an angle from about 30° to about 150°.

15. A wireless power transmitter comprising:
a transmitter coil structure comprising
a magnetic layer having a geometric center line, the magnetic layer forming an angle at the geometric center line;
a first coil coupled to a second coil, the first coil and second coil wound in such a way that when a current flows in the first coil in a first spatial direction the current flows in the second coil in a second spatial direction,
the first coil and the second coil disposed on the magnetic layer substantially symmetrically about the geometric center line of the magnetic layer; and
a housing including an outer surface having a convex shape,
the transmitter coil structure being disposed underneath the outer surface of the housing.

16. The wireless power transmitter of claim 15, wherein the outer surface of the housing is curved substantially symmetrically about the geometric center line of the magnetic layer.

17. The wireless power transmitter of claim 15, wherein the housing has a cross-sectional area of a semicircular shape.

18. The wireless power transmitter of claim 15, wherein the angle formed by the magnetic layer is an angle from about 30° to about 150°.

19. The wireless power transmitter of claim 15, further comprising at least one slot in the outer surface of the housing configured to hold a mobile device in a substantially upright position.

20. The wireless power transmitter of claim 15, further comprising at least one device holder coupled to the outer surface of the housing configured to hold a mobile device in a substantially upright position.

\* \* \* \* \*